J. B. SLAWSON'S Omnibus Fare Box.
No. 4,648. Reissued Nov. 28, 1871.
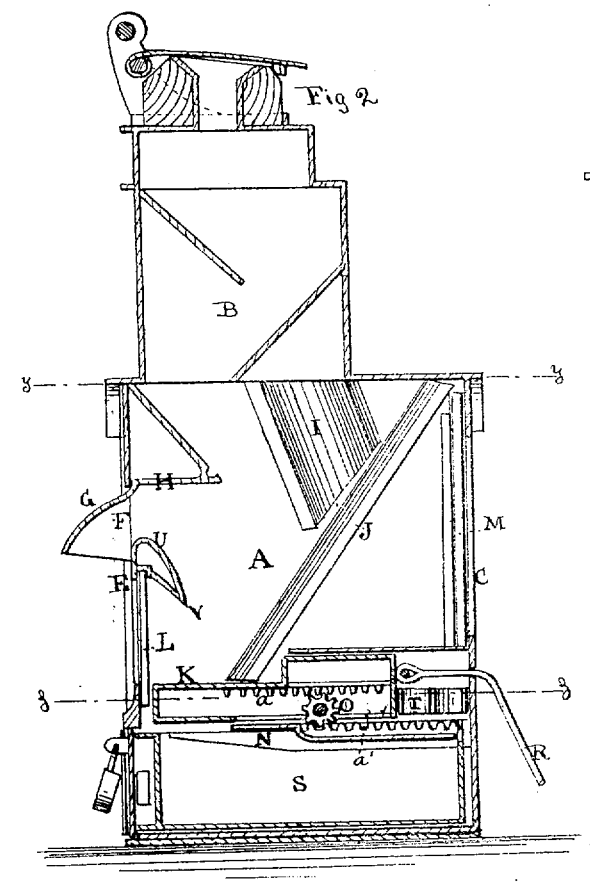
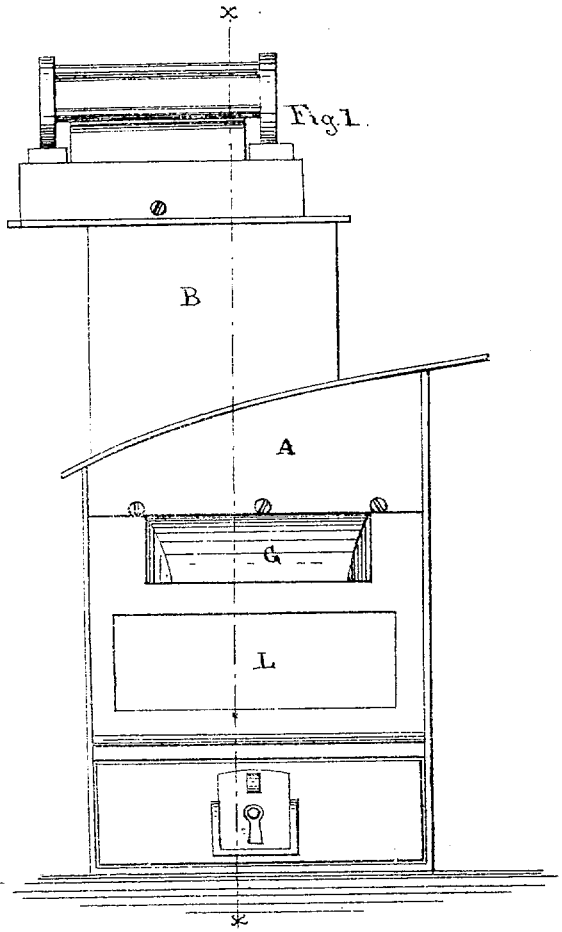
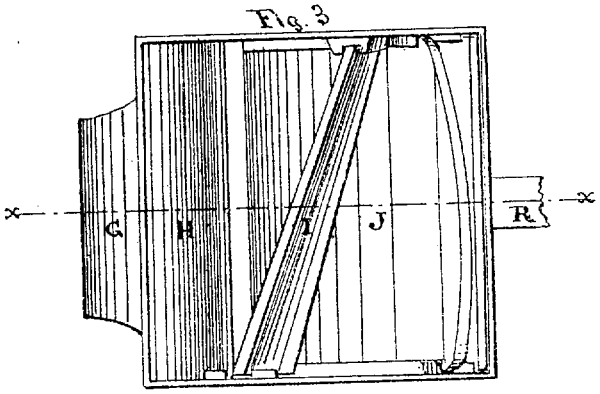
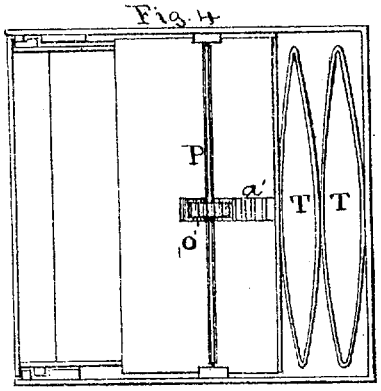
Witnesses
A. McCallum
W. Knight
A. Hanway
Atty. of J. B. Slawson
AM. PHOTO LITHOGRAPHIC CO. N.Y. (OSBORNE'S PROCESS.)

UNITED STATES PATENT OFFICE.

JOHN B. SLAWSON, OF NEW YORK, N. Y.

IMPROVEMENT IN FARE-BOXES FOR VEHICLES.

Specification forming part of Letters Patent No. 105,005, dated July 5, 1870; reissue No. 4,648, dated November 28, 1871.

*To all whom it may concern:*

Be it known that I, JOHN B. SLAWSON, of the city, county, and State of New York, have invented a certain new and useful Improvement in Omnibus Fare-Boxes; and I do hereby declare that the following is a full, clear, and exact description thereof, reference being had to the accompanying drawing forming part of this specification, in which—

Figure 1 represents a front elevation of the box. Fig. 2 represents a vertical section through the line *x x* of Figs. 1 and 3. Fig. 3 represents a horizontal section, taken on the line *y y* of Fig. 2; and Fig. 4, a horizontal section, taken on the line *z z* of Fig. 2.

Boxes for collecting the fares of the passengers in omnibuses and other vehicles carrying both outside and inside passengers require, in order to enable the passengers to deposit their own fares in the box without the intervention of the driver or conductor, two openings, one on the outside of the omnibus for outside passengers, and the other on the inside for inside passengers. For the convenience of the driver, whose duty it is to inspect each fare immediately upon being deposited, the box is arranged in the elevated part of the forward end of the omnibus, at the side of the hole through which the strap passes that enables the driver to close the door. This arrangement is also convenient for the passengers. But while in these respects it is all that could be desired, it nevertheless has its inconveniences, as it limits the size of the box in a vertical direction; as otherwise it would interfere with the accommodation and comfort of the inside passengers, and at the same time render more difficult the inspection of the fare by the driver. This limited depth of the box renders it somewhat difficult to make provision against peculation of the fare through the mouth of the box on the inside of the vehicle—a difficulty much increased by the use of fractional currency in paying the fares; as such requires a much larger opening for its passage into the box than coin or tickets, and hence correspondingly increases its liability to be abstracted and stolen. Moreover, where the currency is new, and consequently stiff, it is apt, when introduced into the box, to stretch across, lie in, and choke up the throat that leads to the money-drawer below, thereby not only rendering it much more easy to be abstracted from the box, but completely preventing the driver from inspecting and verifying the correctness of the amount deposited by each passenger; and hence, in a measure destroying the otherwise great utility of the box. To remedy these difficulties is the object of my improvement; and its nature consists in a new and peculiar arrangement and combination of devices, hereafter to be more particularly set forth, whereby choking of the throat of the box that leads to the money-drawer below is effectually prevented. It also consists in a new and peculiar arrangement and combination of devices to be hereinafter more particularly described, whereby the abstraction of the fare from the box through the mouth on the inside of the omnibus is prevented. And it further consists in a new and improved mode of arresting the fare for inspection by the driver and passengers, and of opening and closing the throat of the chamber that receives the aggregated fares, so as to protect the latter from pilferers—in which connection it may here be proper to state, that each fare, on being deposited into the box and inspected by the driver, is intended to be deposited in the general receiving-chamber before a new fare is introduced into the chamber above for inspection.

To enable others skilled in the art to make, construct, and use my invention, I will now proceed to describe it in detail, omitting a particular description of such parts of the box as are not claimed as new in this patent, and non-essential to a full understanding of the present improvement, which is confined solely to that part of the box arranged on and secured to the inside of the stage.

By reference to the drawing it will be seen that the box is made in two principal parts, of which the one, A, is arranged on and secured to the inside of the stage at its forward end, while the other, B, is projected through the top. Through the opening in the latter the outside passengers deposit their fare; while an opening, F, in the part A enables the inside passengers to pay theirs. My present improvement relates solely to the part A. The box may be made of any suitable material, but so that the two parts A and B shall communicate with each other—that a fare introduced through the mouth of the outside part B will be received by A, and afterwards deposited, on being duly inspected by the driver, into the money-drawer S below, in the same manner as though introduced from within the omnibus. In the side E of the lower part A, fronting the passengers, is formed a narrow aperture or mouth, F, horizontally elongated, through which the inside passengers introduce their fare into the box. Immediately over this mouth, on the outside of box, is arranged and secured a shelving cover, G, the lower edge of which is made to project slightly below the lower lip of the mouth, so that in introducing their fare the passengers are compelled to thrust it in in an upward direction. By means of this cover, and the inclined shelf U arranged directly along the line of the lower lip of the mouth on the inside of the box, and extending along the whole length of the aperture or entirely from side to side of the box, the successful introduction of any instrument for the purpose of abstracting the fare from off either of the plates K and N, or the drawer S below, is prevented. The shelf U may be secured in its position in any suitable manner to the box, and in order to increase its efficiency its lower edge V may be made a cutting-edge, as represented in Fig. 2. Referring again to the fact that the fare is introduced through the mouth F in an upward direction, it will be apparent that unless some obstacle is interposed to its continued upward course until entirely within the box, that the piece of currency will, by virtue of its own gravity, descend endwise, and rest in that position upon the plate K. With short fractional currency this might not be so very objectionable; but when the fact of the necessarily very shallow depth of the box is taken into consideration, and the great length of the currency of the denomination of fifty and twenty-five cent pieces is also taken in consideration, it will then be seen that it becomes a difficulty of so serious a nature that steps must be taken to obviate it; otherwise the throat leading to the drawer S would become choked up, and the efficiency of the box otherwise impaired. For the purpose of removing this difficulty a shelf, H, is secured in a horizontal direction to the inside of the box, so as to overhang the mouth F, and extend from side to side of the box; thus arranged, as the fare is thrust upward through the mouth F, its end is brought in contact with the under side of the shelf H and turned forward in a horizontal direction, so that when fairly passed into the box its tendency will then be to drop down flatwise. This action, however, creates a new difficulty, which must also be removed. This difficulty arises from the peculiar arrangement of the glass-plate J, which is set at such an inclination as will effectually slide the fares as deposited forward over the opening which communicates with the drawer S below. Now, this inclination of the plate J toward the front E of the box brings it so near the shelf U that the currency, when new and consequently stiff, will, in falling flatwise, as before described, drop and rest in a horizontal position upon the shelf U and inclined plate J, its length bridging the two across, as it were. The fare resting in such a position, it is apparent, would not only destroy the usefulness of the box, but would at the same time render it very easy to be abstracted and stolen. Hence, to obviate this trouble I arrange a plate, I, across the part A in an oblique or diagonal direction, so that one end shall be secured to one side of the box at a point much nearer the mouth G or front of the box than the other end to the opposite side, as shown in Fig. 3. In other words, the plate I is set at an angle to the horizontal direction taken by the currency, on being thrust through the aperture F and guided by the shelf H. The plate I in being secured to the sides of the box is set in edgewise, in a vertical or nearly vertical plane, and so that its lower edge shall be below the range of the fare, as it is thrust forward in a horizontal direction by the shelf H. Thus arranged, the horizontally straight-forward direction of the currency, as it is pushed in and guided by the shelf H, is turned obliquely aside across the box until the space becomes wide enough to receive the whole length of the piece; when, being now detached from the hand and having no support, it drops down upon the inclined plate J, and thence slides downward and forward until it rests upon the upper sliding-plate beneath the shelf U, where it is temporarily arrested to allow the driver and passengers time to inspect it before it is passed into the general receiving or money-drawer S below. Thus, by this arrangement, when the currency finally drops upon the apron K it drops in a line approximately at right angles to that at which it was first introduced into the box, and flat, or possibly, at worst, slightly edgewise, instead of endwise, thereby obviating all chance of choking up the throat of the money-drawer; and being brought under the shelter of the shelf U, it is protected from pilferers in their attempts to abstract it from the box, its safety in this respect being much increased by the cover G, compelling everything passed into the box to be introduced in an upward direction. To enable the passengers to examine their fare after it has been deposited, a glass or other transparent medium, L, is inserted in the front of the box, immediately below the cover G. For the same purpose the driver is provided with a transparent plate, M; the inclined plate J is also made transparent, and for the same purpose it is well that the diagonal plate I should also be transparent. The sliding-plate or apron K, which closes the mouth to the drawer S, is provided with a rack, *a*, on its under side, which meshes with a pinion, O, mounted on the shelf P, which latter has its bearings in the sides of the box, as shown in Fig. 4. Immediately beneath the plate K is arranged another sliding-plate, N, having on its upper side a rack, *a'*, also engaging with the pinion O. Both plates slide on suitable ways or guides provided for the purpose. To the rear of the upper plate K is secured one end of a strap, R, the other end of which projects through the front of the stage within convenient reach of the driver. When the driver sees that a passenger has deposited his fare, and that the amount is correct, he pulls the strap, which draws back the plate K, while it throws forward the plate N, allowing the money to drop down the mouth that leads to the drawer S, where it is either received or rests upon the plate N. The driver then lets go the strap, when the plates are forced back to their original position by the recoil of the spring or springs T, which had been previously compressed by the act of pulling the strap. During this operation, should the fare have become lodged on the lower plate N, it will become displaced and dropped into the drawer S below by the bent or returned end of the upper plate K, on the return of the latter plate to its former position. These plates are arranged and operated in this manner for the purpose of preventing the introduction of a stick or other instrument into the money-drawer, for the abstracting the money when the plate K is withdrawn from its mouth. In other respects the box is similar in construction and operation to those now in use.

Having thus described my invention, what I claim as new, and desire to secure by Letters Patent, is—

1. The combination of the cover or hood G, mouth F, and horizontal shelf H, as arranged for the purposes described, with the diagonal plate I, as set forth.

2. In combination with the shelf H, arranged as described, the vertically-arranged diagonal plate I, for the purpose set forth.

3. In combination with the shelf H and plate I, the inclined plate J and shelf U, for the purpose described.

4. The combination of the plates K and N, when moved at the same time in reverse directions, as and for the purpose specified.

5. The combination of racks *a* and *a'*, pinion O, shaft P, spring T, and driver's strap R, as arranged for the purpose specified.

Witnesses: J. B. SLAWSON.

A. McCallum,

P. Hannay.

(42)